(12) United States Patent
Kinoshita

(10) Patent No.: US 11,782,990 B2
(45) Date of Patent: Oct. 10, 2023

(54) DOCUMENT PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Hayato Kinoshita, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 288 days.

(21) Appl. No.: 17/060,177

(22) Filed: Oct. 1, 2020

(65) Prior Publication Data
US 2021/0286990 A1  Sep. 16, 2021

(30) Foreign Application Priority Data

Mar. 12, 2020 (JP) .................................. 2020-043169

(51) Int. Cl.
| | | |
|---|---|---|
| G06K 9/00 | (2022.01) | |
| G06F 16/906 | (2019.01) | |
| G06F 16/93 | (2019.01) | |
| G06V 30/413 | (2022.01) | |
| G06V 30/414 | (2022.01) | |
| G06V 30/416 | (2022.01) | |
| G06V 30/40 | (2022.01) | |

(52) U.S. Cl.
CPC ............ *G06F 16/906* (2019.01); *G06F 16/93* (2019.01); *G06V 30/40* (2022.01); *G06V 30/413* (2022.01); *G06V 30/414* (2022.01); *G06V 30/416* (2022.01)

(58) Field of Classification Search
CPC .. G06V 30/413; G06V 30/414; G06V 30/416; G06F 16/906; G06F 16/93
See application file for complete search history.

(56) References Cited

U.S. PATENT DOCUMENTS

| | | | | |
|---|---|---|---|---|
| 7,068,834 | B1* | 6/2006 | Ikeda | G06T 7/0004 356/237.4 |
| 8,737,724 | B2* | 5/2014 | Abdo | G06V 20/62 382/232 |
| 2002/0001404 | A1* | 1/2002 | Yoshikawa | G06T 7/60 382/145 |
| 2004/0013302 | A1* | 1/2004 | Ma | G06V 30/414 382/209 |
| 2009/0028437 | A1* | 1/2009 | Hirohata | G06V 30/19033 382/201 |
| 2011/0255790 | A1* | 10/2011 | Duggan | G06V 30/262 382/190 |
| 2013/0195376 | A1* | 8/2013 | Baheti | G06V 30/18095 382/289 |
| 2017/0097983 | A1* | 4/2017 | Morimoto | G06F 16/24578 |
| 2018/0067957 | A1* | 3/2018 | Paterson | G06F 16/185 |

FOREIGN PATENT DOCUMENTS

JP  2017-107455 A  6/2017

* cited by examiner

*Primary Examiner* — Edward F Urban
*Assistant Examiner* — Duy Tran
(74) *Attorney, Agent, or Firm* — Oliff PLC

(57) ABSTRACT

A document processing apparatus including a processor configured to receive data including plural document sets each made up of predetermined plural pages; classify the data into sets; and in a case where the data includes an unclassified page, display a candidate for a set to which the unclassified page belongs.

10 Claims, 16 Drawing Sheets

FIG. 3
⚠ CERTAINTY OF FORM CLASSIFICATION IS LOW. SELECT ONE OF CANDIDATES BELOW FOR CONFIRMATION.
LIST OF THUMBNAILS OF
LOW CLASSIFICATION
CERTAINTY
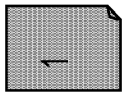
OK   NONE

FIG. 4

⚠ CERTAINTY OF FORM CLASSIFICATION IS LOW. SELECT ONE OF CANDIDATES BELOW FOR CONFIRMATION.

LIST OF THUMBNAILS OF LOW CLASSIFICATION CERTAINTY

FORM CLASSIFICATION CERTAINTY: 60
ATTACHMENT TYPE CERTAINTY: 40

LIST OF THUMBNAILS OF FORM AND ATTACHMENT TYPE CANDIDATES

FORM TYPE 1-P2: CERTAINTY 60

FORM TYPE 3-P3: CERTAINTY 55

ATTACHMENT-DRIVER'S LICENSE: CERTAINTY 40

ATTACHMENT-RESIDENCE CERTIFICATE: CERTAINTY 35

ATTACHMENT-RESIDENCE CERTIFICATE: CERTAINTY 33

ATTACHMENT-RESIDENCE CERTIFICATE: CERTAINTY 31

OK   NONE

FIG. 8

■ FORM/ATTACHMENT TYPE SELECTED IMAGE

CHECK IF PAGE MATCHES SELECTED FORM.

NEXT

SCAN TIME AND DATE

P1: 12/11/2019  13:24:18.943
P2: 12/11/2019  13:24:19.231
P3: 12/11/2019  13:24:19.543

FORM TYPE 1-P2: SET CANDIDATE 1

RETURN

RETURN

OK

DISPLAY GROUND

ORDER IN WHICH CANDIDATES ARE DISPLAYED: | CLOSENESS IN SCAN TIME AND DATE | ▽

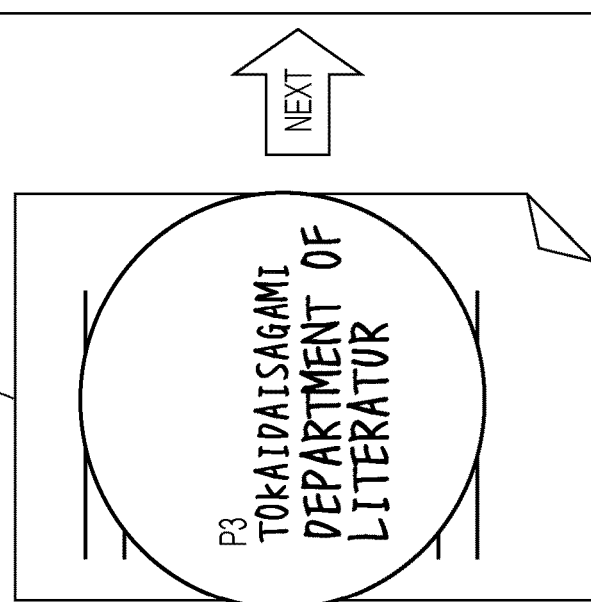
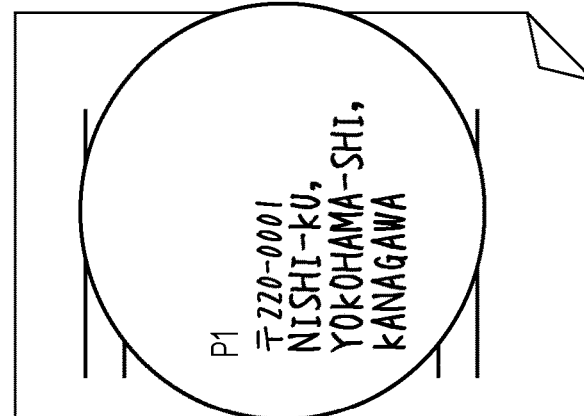

FIG. 10

- FORM/ATTACHMENT TYPE SELECTED IMAGE

CHECK IF PAGE MATCHES SELECTED FORM.

P1
NAME: TARO FUJI

P2
SIGNATURE: TARO FUJI

P3
NONE

NEXT
RETURN

FORM TYPE 1-P2: SET CANDIDATE 1

ORDER IN WHICH CANDIDATES ARE DISPLAYED: CLOSENESS IN WRITTEN CONTENTS

DISPLAY GROUND

OK    RETURN

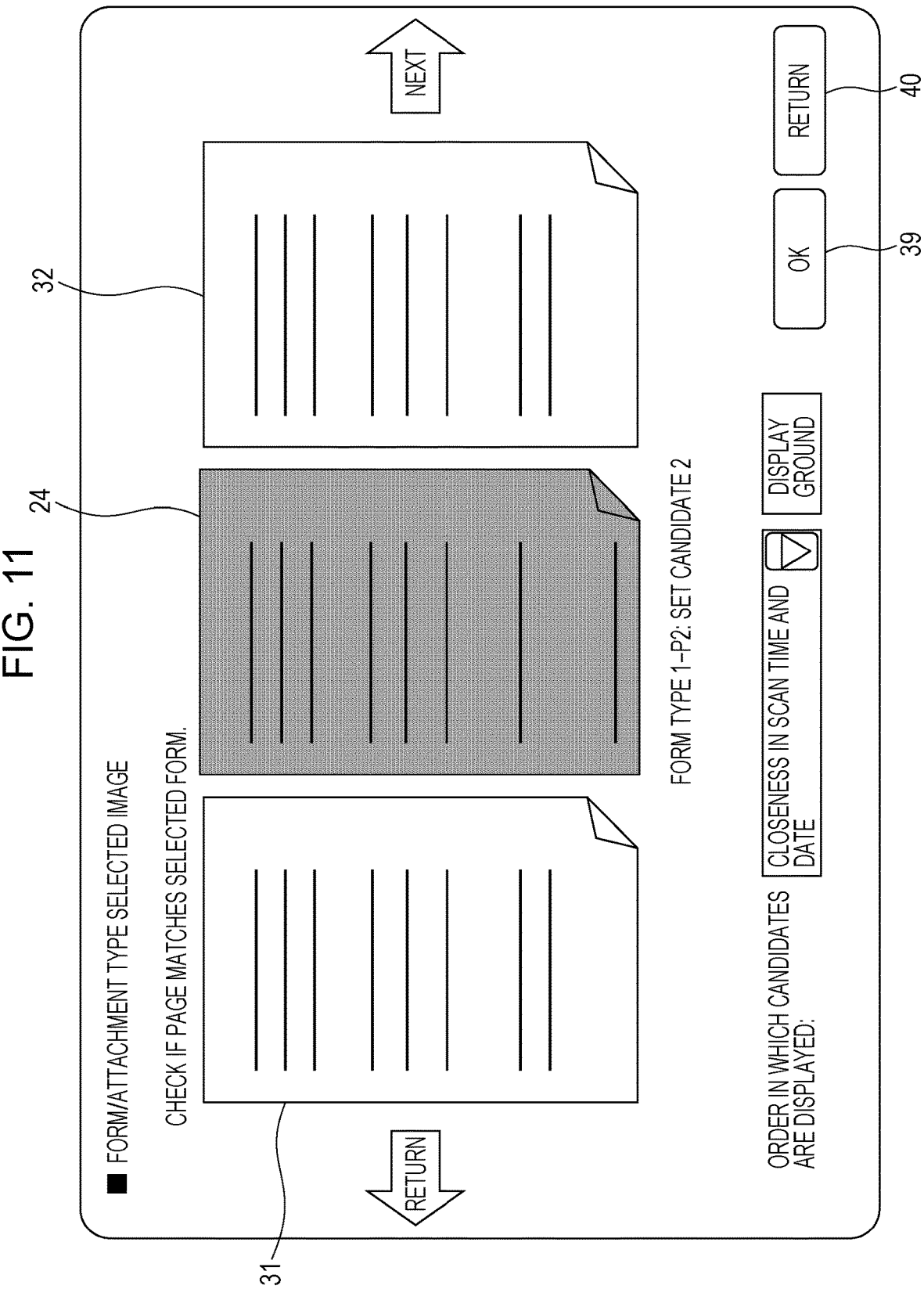

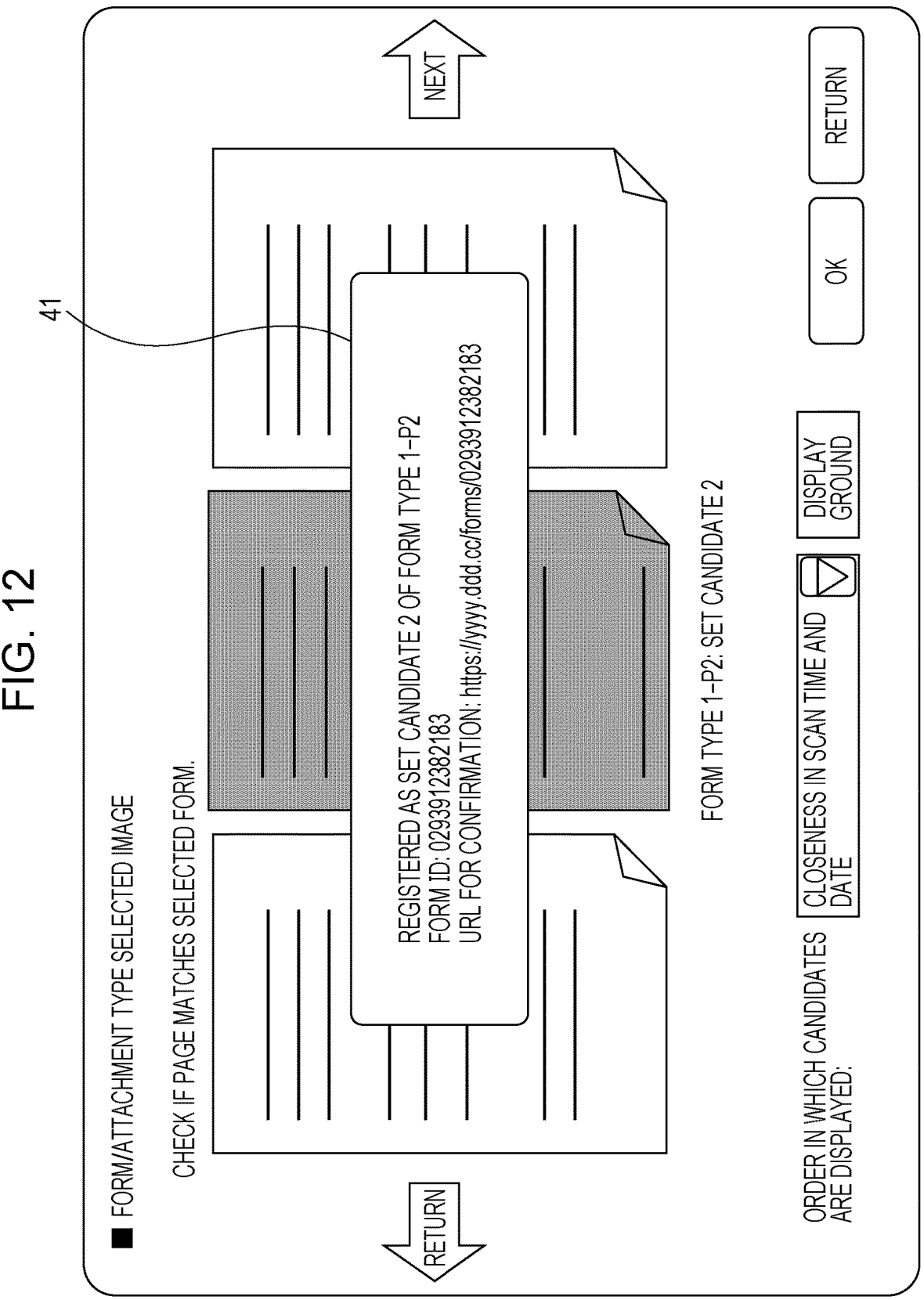

FIG. 13

■ LIST OF SOLITARY PAGES   PAGES FOR WHICH NO CORRESPONDING SET HAS BEEN FOUND FROM CANDIDATES
LIST OF SOLITARY PAGES THAT ARE NOT ALLOCATED TO SET

SOLITARY FORM PAGE ID: 001
TYPE: FORM TYPE 1
PAGE: P2
NAME (OCR): TARO FUJI

SOLITARY FORM PAGE ID: 002
TYPE: FORM TYPE 2
PAGE: P1
NAME (OCR): HANAKO FUJI

SOLITARY FORM PAGE ID: 003
TYPE: FORM TYPE 1
PAGE: P3
NAME (OCR): KANTARO FUJI

SOLITARY FORM PAGE ID: 004
TYPE: ATTACHMENT-DRIVER'S LICENSE
PAGE: P4
NAME (OCR): TARO FUJI

SOLITARY FORM PAGE ID: 005
TYPE: FORM TYPE 5
PAGE: P1
NAME (OCR): KAYA MINAMITANI

SOLITARY FORM PAGE ID: 006
TYPE: ATTACHMENT-RESIDENCE CERTIFICATE
PAGE: P2
NAME (OCR): WAKUSEI YOKOHAMA

OK — 42

DOCUMENT PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-043169 filed Mar. 12, 2020.

BACKGROUND

(i) Technical Field

The present disclosure relates to a document processing apparatus and a non-transitory computer readable medium.

(ii) Related Art

There are techniques for classifying a form according to a type thereof by reading the form and determining the type thereof on the basis of the read image. However, it is sometimes impossible to specify a type of form from a read image. To deal with such a situation, a technique for determining a type of read form has been proposed (see, for example, Japanese Unexamined Patent Application Publication No. 2017-107455). According to this conventional technique, a region of a form where a score concerning classification is high is highlighted so that a user can select a correct type by referring to the highlighted region in a case where reliability of classification of the form is not higher than a decision threshold value and is higher than a candidate threshold value.

SUMMARY

In a case where data including plural document sets each made up of predetermined plural pages is classified into the sets, a page that cannot be classified is sometimes found. In this case, a user needs to determine to which set this page belongs and classify the page into a proper set.

Aspects of non-limiting embodiments of the present disclosure relate to lessening user's trouble of specifying a proper set to which a page that cannot be classified belongs in a case where data including plural documents each made up of plural pages is classified into sets as compared with a case where a candidate for a set to which the page can belong is not displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a document processing apparatus including a processor configured to receive data including plural document sets each made up of predetermined plural pages; classify the data into sets; and in a case where the data includes an unclassified page, display a candidate for a set to which the unclassified page belongs.

BRIEF DESCRIPTION OF THE DRAWINGS

An exemplary embodiment of the present disclosure will be described in detail based on the following figures, wherein:

FIG. 3 illustrates an example of a display screen on which a list of pages that cannot be classified into any document set is displayed according to the present exemplary embodiment;

FIG. 4 illustrates an example of a display screen displayed after any of the pages is selected in FIG. 3;

FIG. 8 illustrates an example of a display screen on which a reason for selection of a displayed candidate set as a candidate is displayed according to the present exemplary embodiment;

FIG. 9 illustrates another example of a display screen on which a reason for selection of a displayed candidate set as a candidate is displayed according to the present exemplary embodiment;

FIG. 10 illustrates another example of a display screen on which a reason for selection of a displayed candidate set as a candidate is displayed according to the present exemplary embodiment;

FIG. 11 illustrates an example of a display screen displayed when a candidate switching button is selected in FIG. 7;

FIG. 12 illustrates an example of a display screen displayed when a page to be processed is registered in a set according to the present exemplary embodiment;

FIG. 13 illustrates an example of a display screen on which solitary pages stored in the solitary page storage unit 18 are displayed according to the present exemplary embodiment;

DETAILED DESCRIPTION

An exemplary embodiment of the present disclosure is described below with reference to the drawings.

A document processing apparatus 1 according to the present exemplary embodiment can be realized by a hardware configuration of an existing general-purpose computer such as a personal computer (PC). That is, the document processing apparatus includes a CPU, a ROM, a RAM, a storage unit such as a hard disk drive (HDD), a user interface unit such as a mouse and a keyboard provided as input units and a display provided as a display unit, and a network interface provided as a communication unit.

Figure 1:
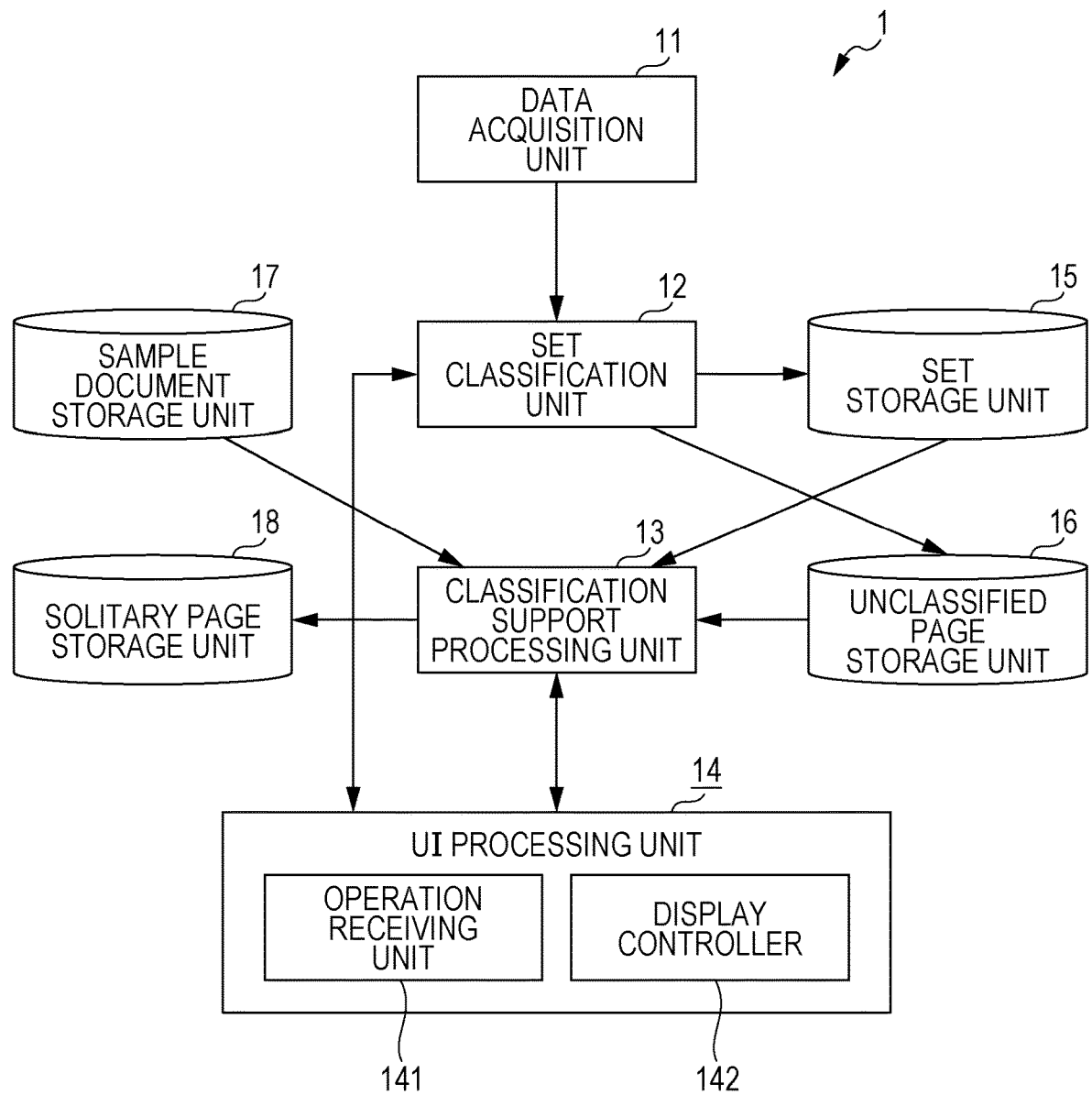
FIG. 1 is a block diagram illustrating a configuration of a document processing apparatus according to an exemplary embodiment of the present disclosure.

FIG. 1 is a block diagram illustrating a configuration of the document processing apparatus 1 according to an exemplary embodiment of the present disclosure. The document processing apparatus 1 according to the present exemplary embodiment includes a data acquisition unit 11, a set classification unit 12, a classification support processing unit 13, a user interface (UI) processing unit 14, a set storage unit 15, an unclassified page storage unit 16, a sample document storage unit 17, and a solitary page storage unit 18. Illustration of constituent elements that are not used for description of the present exemplary embodiment is omitted in FIG. 1.

The data acquisition unit 11 acquires data to be processed. In the present exemplary embodiment, a document made up of predetermined plural pages is handled, and "data" in the present exemplary embodiment includes plural document sets. The set classification unit 12 classifies each page included in the data into any document set (hereinafter also referred to simply as a "set"). For example, in a case where 5 document sets each made up of 10 pages are handled, the data includes 50 pages, and the set classification unit 12 classifies the data made up of 50 pages into the five document sets. In a case where there is a page that cannot be classified into any set, for example, because a document type of the page cannot be specified, it is left to a user to determine to which set the page belongs. The classification support processing unit 13 supports this user's classification of the page. The user interface processing unit 14 includes an operation receiving unit 141 and a display controller 142. The operation receiving unit 141 receives a user's operation using the units such as the mouse and the keyboard. The display controller 142 controls what is displayed on the display.

The set storage unit 15 stores therein document sets into which pages whose document types have been specified have been successfully classified by the set classification unit 12. The unclassified page storage unit 16 stores therein an unclassified page whose document type cannot be specified by the set classification unit 12. The page stored in the unclassified page storage unit 16 is classified into any set by the classification support processing unit 13, but a page that cannot be classified into any set even by the classification support processing unit 13 is stored in the solitary page storage unit 18. The sample document storage unit 17 stores therein a sample of a document handled in the present exemplary embodiment. In the present exemplary embodiment, it is assumed that a document type of each page of a document is a form or an attached document. The "form" is a kind of document having a predetermined format on which some sort of information is written, for example, by hand. The form is, for example, a delivery slip or a billing statement, and the attached document attached to the form is, for example, a driver's license or an insurance card. The sample document includes sample images of pages of respective document types (e.g., a delivery slip, a driver's license). The samples images prepared for the respective document types are hereinafter referred to as "sample pages". The samples pages are, for example, images of page formats.

The constituent elements 11 to 14 of the document processing apparatus 1 are realized by cooperation of a computer that constitutes the document processing apparatus 1 and a program operating on the CPU mounted in the computer. The storage units 15 to 17 are realized by the HDD mounted in the document processing apparatus 1. Alternatively, the storage units 15 to 17 may be external storage units used over a network.

The program used in the present exemplary embodiment may be offered by a communication unit or may be offered by being stored in a computer-readable recording medium such as a CD-ROM or a USB memory. The program offered from the communication unit or the recording medium is installed in the computer, and the CPU of the computer executes such programs sequentially to realize various kinds of processing.

As described above, the "data" according to the present exemplary embodiment includes plural document sets each made up of predetermined plural pages. The number of pages that constitute a set is known, and all of the sets include the same number of pages. Furthermore, the pages, that is, document types of the pages (hereinafter referred to as "page types") are arranged in the same predetermined order in all of the sets. Accordingly, in a case where a page type can be specified, it is possible to specify where the page is located in a set to which the page belongs. For example, assume that data includes 3 document sets each made up of 4 pages arranged in an order of a delivery slip, a billing statement, a receipt, and an attached document. That is, the data is made up of 12 pages. Each page included in the data is classified into any set by automatic classification processing, but there may be a page that cannot be classified into any set for some reason. Even in this case, in a case where a page type of the page that cannot be classified is specified, for example, as a billing statement by a user, the page that cannot be classified (i.e., the billing statement) can be specified as being located at page 2 of a set.

However, to which set this billing statement belongs among the 3 sets cannot be specified. In a case where a billing statement is missing in only one of the sets that constitute the data, the set in which the billing statement is missing can be easily specified as a set to which the billing statement belongs. However, in a case where the data includes, for example, 100 document sets and 3 pages (billing statements) cannot be classified into any set, it is not easy to specify to which set each of these billing statements belongs.

Figure 2A:
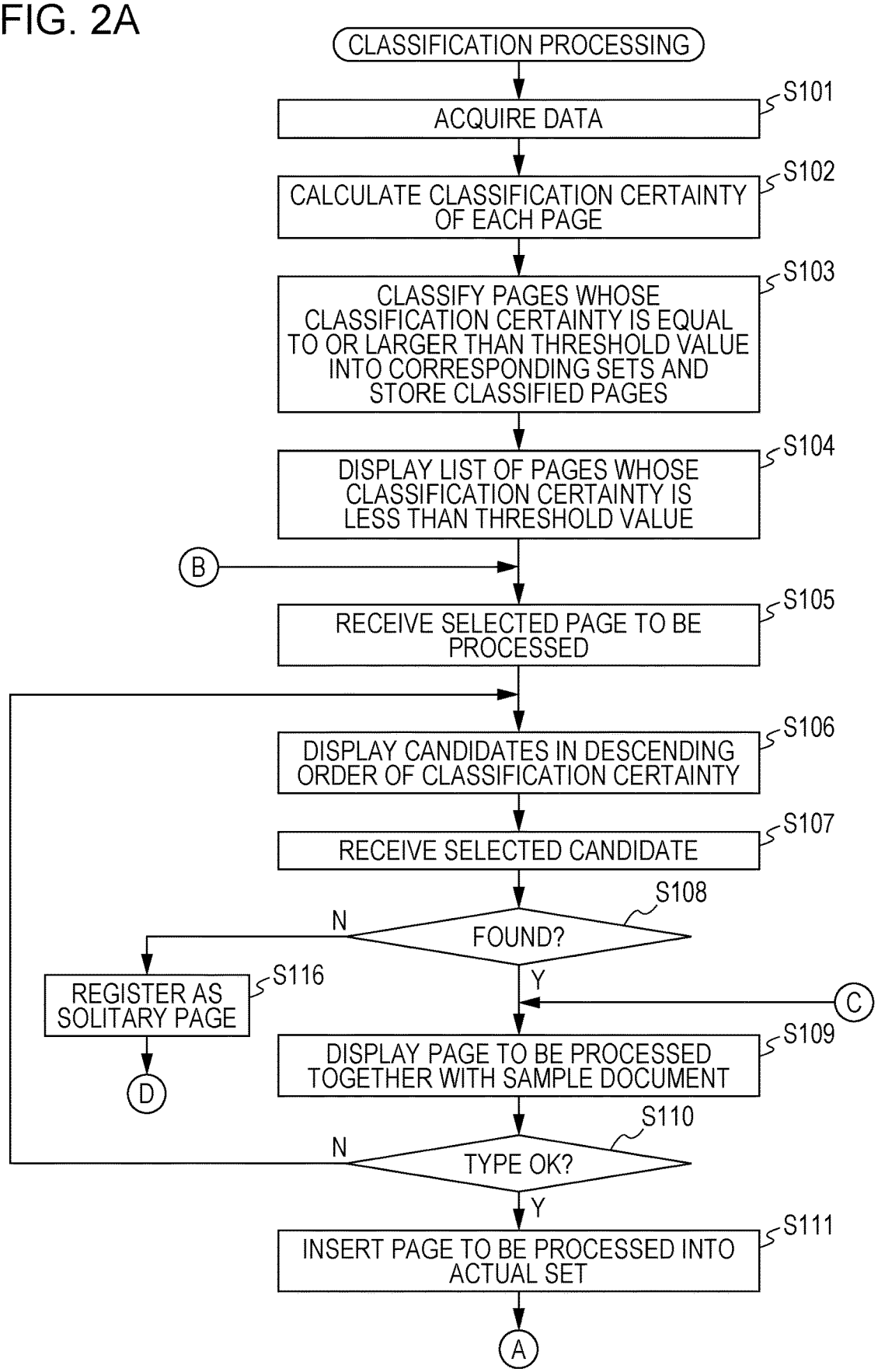
FIG. 2A is a flowchart of processing for classifying data into document sets according to the present exemplary embodiment.
Figure 2B:
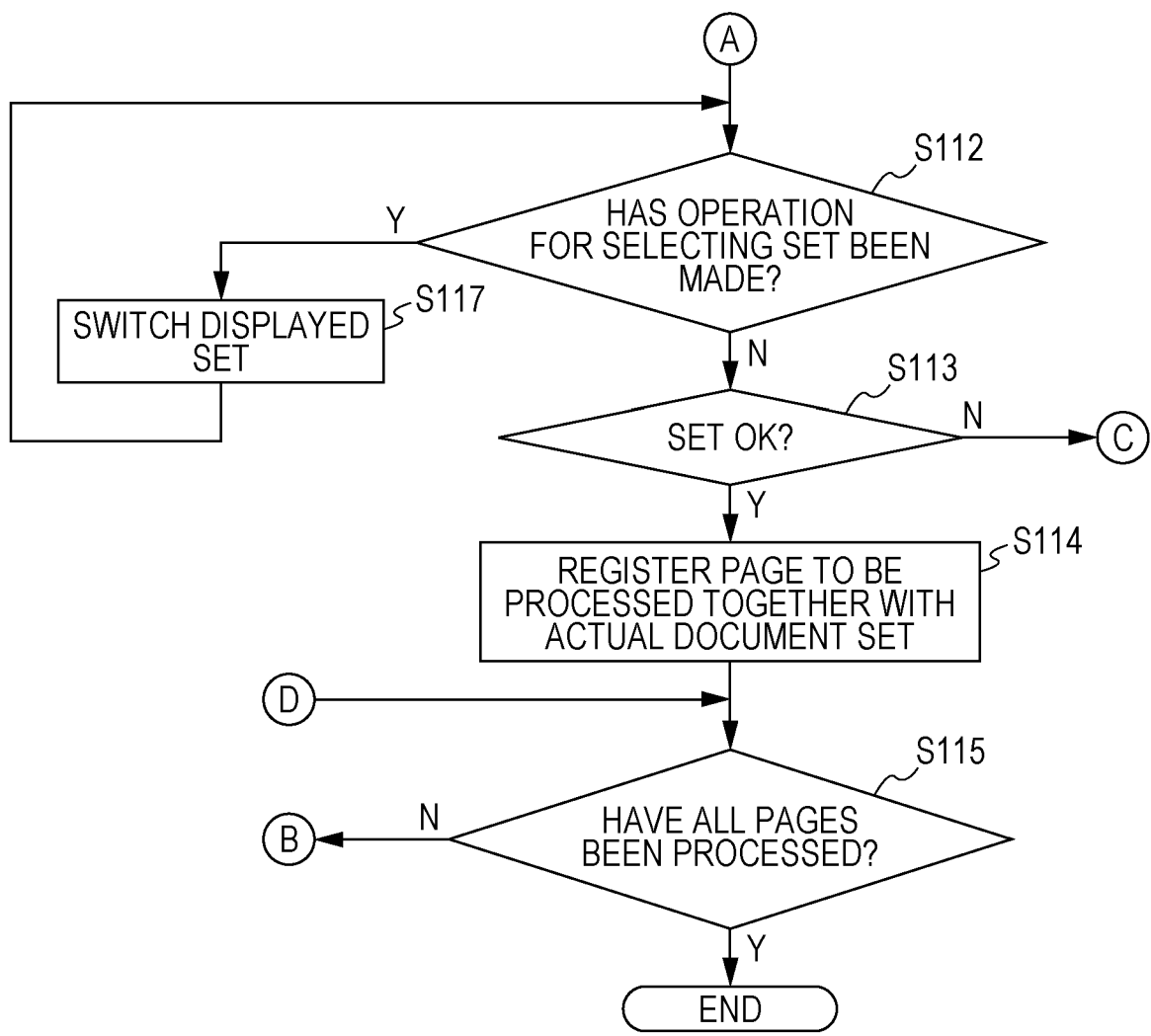
FIG. 2B is a flowchart continued from FIG. 2A.

In view of this, in the present exemplary embodiment, the work of specifying a set to which a page that cannot be classified even in such a case belongs is supported so that the page can be classified. Processing for classifying a page into a set according to the present exemplary embodiment is described below with reference to the flowchart of FIG. 2. The present exemplary embodiment discusses an example in which a form is handled as a document.

The data acquisition unit 11 acquires data (step 101). The data includes plural document sets. Each document includes pages whose document type is a form or an attached document. Image data of each document is created by reading the document by a scanner. In the present exemplary embodiment, image data of a document is also referred simply as a "document" for convenience of description. Each document is made up of image data of plural pages. In the present exemplary embodiment, image data of a page is also referred simply as a "page" for convenience of description.

Next, the set classification unit 12 calculates classification certainty of each page included in the data (step 102). The classification certainty is an index indicative of accuracy of automatic determination of a page type. The classification certainty ranges from 0 to 100, and a larger value indicates higher accuracy of determination of a page type. In a case where a page type cannot be determined, the page cannot be classified into any set. The classification certainty is calculated by using an existing technique. In the present exemplary embodiment, the classification certainty is calculated, for example, by comparing a page with a sample page. In the present exemplary embodiment, a predetermined threshold value for determining whether or not classification of each page into a set is correct is set in advance. The set classification unit 12 classifies a page whose calculated classification certainty is equal to or higher than the predetermined threshold value into a corresponding set and stores the classified page in the set storage unit 15 (step 103). Meanwhile, the set classification unit 12 registers a page whose classification certainty is less than the predetermined threshold value in the unclassified page storage unit 16.

The classification support processing unit 13 causes the display controller 142 to display a list of pages registered in the unclassified page storage unit 16 on a screen (step 104). Note that the display controller 142 performs display control for displaying information on the display in accordance with instructions from the set classification unit 12 and the classification support processing unit 13. In the following description, description of operation of the display controller 142 is omitted for simplification of description.

FIG. 3 illustrates an example of a display screen on which a list of pages whose classification certainty is less than the predetermined threshold value is displayed according to the present exemplary embodiment. On the display screen, reduced images (hereinafter referred to as "thumbnails") of pages whose classification certainty is less than the predetermined threshold value are displayed. The pages whose classification certainty is less than the predetermined threshold value are synonymous with pages that cannot be classified into any set because of their classification certainty lower than the predetermined threshold value among the pages included in the data. A user selects a page to be processed on the display screen illustrated in FIG. 3. When the operation receiving unit 141 receives this operation of selecting a page, the classification support processing unit 13 receives the selected page (hereinafter also referred to as a "page to be processed") (step 105). Although some sort of user's operation is received by the operation receiving unit 141 as described above, description of operation of the operation receiving unit 141 is omitted in the following description for simplification of the description. FIG. 3 illustrates an example in which a page given a page number 1 has been selected as a page to be processed.

FIG. 4 illustrates an example of a display screen displayed after the page to be processed is selected. FIG. 4 illustrates a display region 21 where the list of pages illustrated in FIG. 3 is displayed, a display region 22 where information on the page to be processed is displayed, and a display region 23 where candidate pages of a type of the page to be processed are displayed. The display region 21 where the list of pages is displayed has been already described with reference to FIG. 3. In the display region 22 where information on the page to be processed is displayed, an image 24 of the page to be processed selected in FIG. 3 and classification certainty calculated in step 102 are displayed. In the present exemplary embodiment, it is assumed that each document includes a form and an attached document. In view of this, classification certainty (hereinafter referred to as "form classification certainty") obtained assuming that the page to be processed is a form and classification certainty (hereinafter referred to as "attachment type certainty") obtained assuming that the page to be processed is an attached document are separately calculated. In the display region 23, page types whose classification certainty calculated for the page to be processed is lower than the predetermined threshold value are displayed (step 106).

In the display region 23, the page types (whose classification certainty is lower than the predetermined threshold value) are arranged in a descending order of classification certainty. Displayed in the display region 23 are sample pages corresponding to the page types stored in the sample document storage unit 17. A thumbnail of each sample page is accompanied by a page type (e.g., "FORM TYPE 1", "ATTACHMENT-DRIVER'S LICENSE"), a page number (i.e., information (e.g., "P2") indicative of the page number) in a set in a case where the page type is a form, and classification certainty of the page to be processed calculated for the document type indicated by the sample page. Although FIG. 4 illustrates an example in which sample pages corresponding to six document types are displayed in a descending order of classification certainty, the number of displayed pages is not limited to this. A user interface on which the display region 23 can be scrolled may be employed.

When the user selects an "OK" button 26 after selecting a page type which the user presumes to be a page type of the selected page to be processed by referring to the sample pages displayed in the display region 23, the classification support processing unit 13 receives the selected page type (step 107). It is assumed here that a thumbnail 25 of a sample page corresponding to "FORM TYPE 1" is selected. In this case, the classification support processing unit 13 acquires a sample document including the sample page from the sample document storage unit 17 and causes the sample document to be displayed on a screen.

Figure 5:
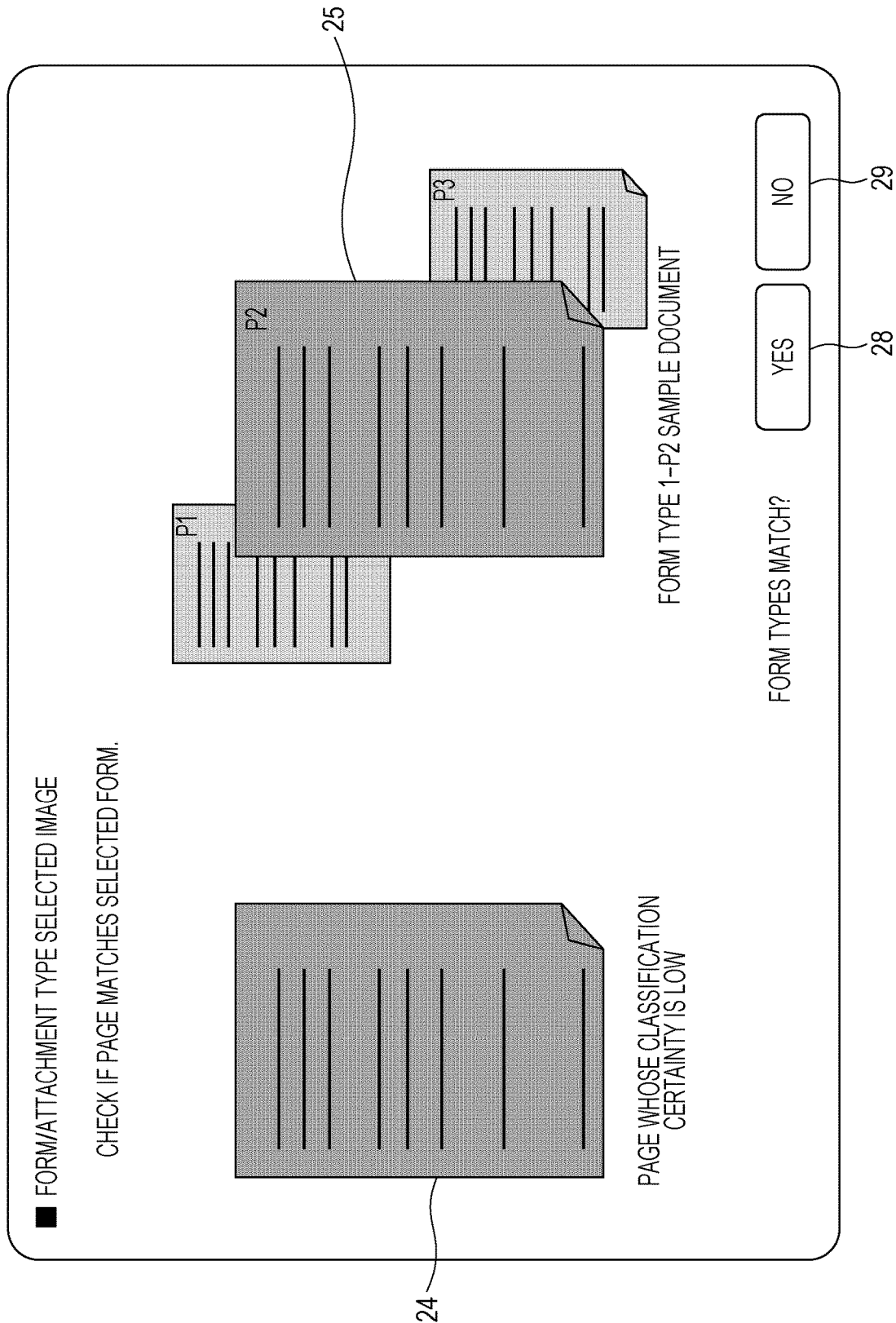
FIG. 5 illustrates an example of a display screen displayed after a page type is selected in FIG. 4.

FIG. 5 illustrates an example of a display screen displayed in a case where a page type is selected and the "OK" button 26 is selected in FIG. 4 (Y in step 108). As illustrated in FIG. 5, the image of the page of low classification certainty displayed in the display region 22 in FIG. 4, that is, the image 24 of the page to be processed is displayed in a left portion of the screen. Hereinafter, the image 24 of the page to be processed is also referred to simply as a "page to be processed 24". In a right portion of the screen, images of pages of a sample document including the sample page selected in the display region 23 are displayed. Hereinafter, the image 25 of the sample page is also referred to simply as a "sample page 25". The classification support processing unit 13 causes the sample page 25 to be displayed in a size larger than other sample pages in front of the other sample pages so that the user can easily compare the page to be processed 24 and the sample page 25 corresponding to the page to be processed.

Figure 6:
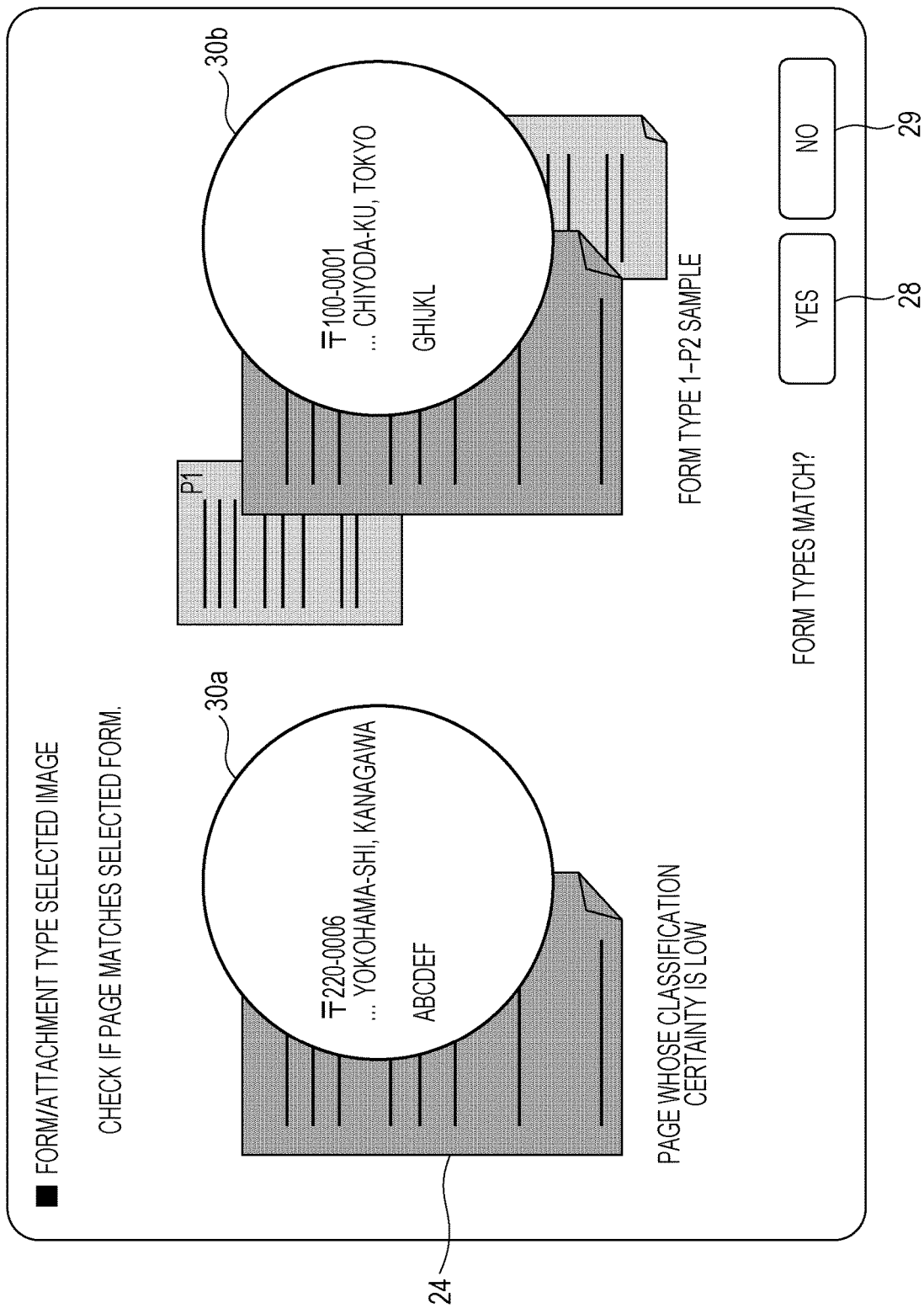
FIG. 6 illustrates an example of a display screen displayed when an image of a page is partially enlarged in FIG. 5.

As described above, the classification support processing unit 13 causes the page to be processed 24 to be displayed together with the sample document (step 109). When the user moves a mouse cursor onto the page to be processed 24 and then performs a predetermined operation (e.g., a right click), the classification support processing unit 13 extracts an image of a predetermined range around the position of the mouse cursor and causes the extracted image to be displayed in an enlarged size in a display region 30a. Furthermore, the classification support processing unit 13 also causes an image of a part of the sample page 25 corresponding to the range extracted from the page to be processed 24 to be displayed in an enlarged size in a display region 30b. FIG. 6 illustrates an example of a screen displayed in this case. Note that the operation for displaying the display region 30a is not limited to a right click and may be a dropping operation, in which case the user designates a range to be displayed in an enlarged size. Although the user's operation is performed on the page to be processed 24 in this example, the user's operation may be performed on the sample page 25. In this case, an enlarged image of a part of the sample page 25 is displayed in the display region 30b, and an enlarged image of a corresponding part of the page to be processed 24 is also displayed in the display region 30*a*.

In a case where the user determines that the selected sample page 25 is not a correct sample page corresponding to the page to be processed 24 by referring to the display screen illustrated in FIG. 5, the user selects a "NO" button 29. In this case (N in step 110), the processing returns to step 106, in which the classification support processing unit 13 displays the display screen (FIG. 4) on which the page type candidates are displayed so that the user can select a document type again.

In a case where the user determines that the selected sample page 25 is a correct sample page corresponding to the page to be processed by referring to the display screen illustrated in FIG. 5 or 6, the user selects a "YES" button 28. In this case (Y in step 110), the classification support processing unit 13 acquires a set in which the page to be processed is missing (a set in which page 2 is missing in the above example) from the set storage unit 15 and causes the set to be displayed on a screen.

Figure 7:
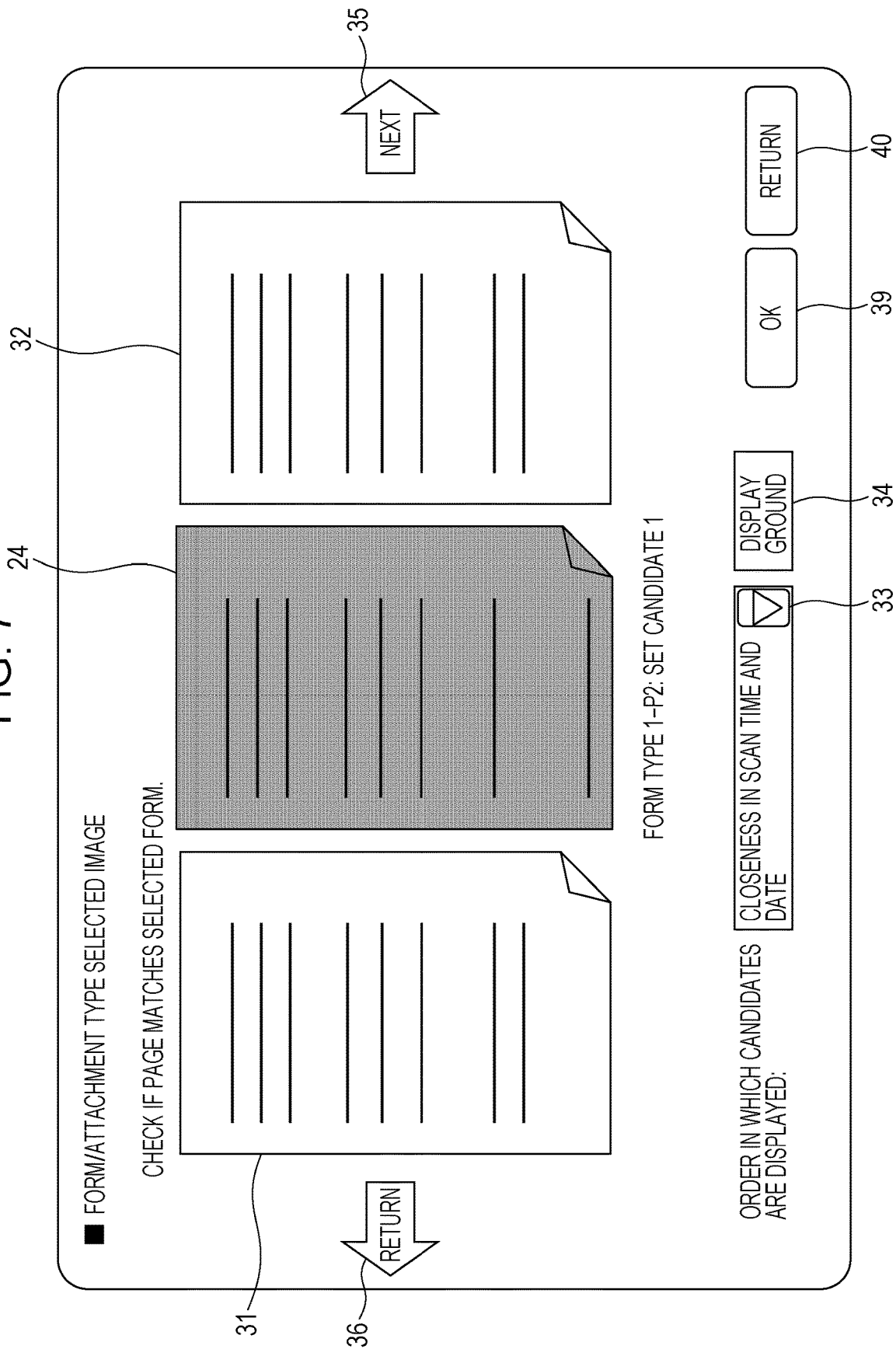
FIG. 7 illustrates an example of a display screen displayed in a case where a user determines that a type of sample document is correct in FIG. 5 or 6.

FIG. 7 illustrates an example of a display screen displayed in a case where the "YES" button 28 is selected. The classification support processing unit 13 causes the page to be processed 24 to be displayed together with a candidate set in which page 2 is missing (step 111). Specifically, the classification support processing unit 13 inserts the image 24 of the page to be processed into a position between an image 31 of page 1 and an image 32 of page 3 of the set, that is, a position of missing page 2 in the candidate set.

Plural sets in which page 2 is missing may be sometimes registered in the set storage unit 15. In this case, in the present exemplary embodiment, candidates for a set into which the page to be processed is to be inserted are given priority levels and displayed in an order of priority. In the present exemplary embodiment, the user selects any of scan time and date, handwriting, and written contents as an index for determining an order in which the candidate sets are displayed, and the candidate sets can be thus given priority levels in accordance with the index selected by the user. The following describes how the candidate sets are displayed in consideration of the priority levels with reference to FIGS. 8 through 10.

On the display screen illustrated in FIG. 7, the user causes a pull-down menu to be displayed by operating an arrow button 33 and selects "CLOSENESS IN SCAN TIME AND DATE" in the pull-down menu. Note that "CLOSENESS IN SCAN TIME AND DATE" is set as a default value for determining an order in which the candidate sets are displayed as illustrated in FIG. 7, and therefore the user need not perform an operation for selecting "CLOSENESS IN SCAN TIME AND DATE". The classification support processing unit 13 arranges the candidate sets in an order of closeness in scan time and date to the page to be processed in accordance with the index "scan time and date" selected by the user. More specifically, the user refers to scan times and dates of page 1 and page 3 of each set. Assume that each set is scanned from page 1, it may be determined that a set whose page 1 or page 3 was scanned at time and date closest to the page to be processed (page 2 in this example) is a set to which the page to be processed belongs. Scan time and date of each page is included in property information of the page. In the present exemplary embodiment, it is assumed that data read by a scanner is instantly classified into sets, and therefore it is assumed that scan time and date of each page is time and date of receipt of the page by the document processing apparatus 1.

The classification support processing unit 13 compares the scan time and date of the page to be processed and scan time and date of page 1 (or page 3) of each set and arranges the candidate sets in an order of closeness in scan time and date. The order of closeness in scan time and date is, in other words, an order of similarity in scan time and date to the page to be processed.

When the user selects a "DISPLAY GROUND" button 34 after selecting an index (scan time and date in this example) for determining an order of priority of the candidate sets, the classification support processing unit 13 displays times and dates of scan of pages corresponding to the images 31, 24, and 32 as a reason why the set has been selected as a candidate, in other words, a ground for displaying the set in response to this selecting operation, as illustrated in FIG. 8. The user can check whether or not the displayed candidate set is a set to which the page to be processed belongs by referring to scan times and dates of the page to be processed and page 1 previous to the page to be processed and page 3 next to the page to be processed.

When the user causes the pull-down menu to be displayed by operating the arrow button 33 and selects "CLOSENESS IN HANDWRITING" in the pull-down menu, the classification support processing unit 13 detects handwritten characters by analyzing the page to be processed 24 in response to this operation. Then, the classification support processing unit 13 also detects handwritten characters from the candidate sets. Then, the classification support processing unit 13 arranges the candidate sets in an order of similarity of handwriting to the page to be processed 24, that is, in a descending order of similarity of handwriting by comparing the handwritten characters in the page to be processed 24 and the handwritten characters in each candidate set.

When the user selects the "DISPLAY GROUND" button 34 after selecting an index (handwriting in this example) for determining an order of priority of the candidate sets, the classification support processing unit 13 displays handwritten characters detected from the images 31, 24, and 32 in an enlarged size in response to this selecting operation, as illustrated in FIG. 9. Note that handwritten characters of the same category (address in FIG. 9) are desirably displayed so that the user can easily compare the handwritten characters. However, the compared pages are pages of different document types and therefore do not always include characters of the same category. In view of this, the displayed handwritten characters need not be limited in particular. If there is no handwritten character, nothing needs to be displayed.

When the user causes the pull-down menu to be displayed by operating the arrow button 33 and selects "CLOSENESS IN WRITTEN CONTENTS" in the pull-down menu, the classification support processing unit 13 compares written contents in the page to be processed 24 and written contents in each candidate set by performing character recognition processing and natural language processing on the images 31, 24, and 32 in response to this operation and arranges the candidate sets in a descending order of similarity in written contents.

When the user selects the "DISPLAY GROUND" button 34 after selecting an index (written contents in this example) for determining an order of priority of the candidates sets, the classification support processing unit 13 displays written contents extracted from the images 31, 24, and 32 in an enlarged size in response to this selecting operation, as illustrated in FIG. 10. Note that written contents of the same category (name in FIG. 10) are desirably displayed so that the user can easily compare the written contents. However, the compared pages are pages of different document types and therefore do not always include written contents of the same category. In view of this, "NONE" is displayed as for a page (e.g., page 3) having no corresponding written contents.

In this way, the user checks whether or not the displayed candidate set is a correct set to which the page to be processed belongs. In a case where the user wants to refer to another candidate set, the user selects a "NEXT" button 35 or a "RETURN" button 36 provided as a candidate switching button. When the user performs the operation of selecting the candidate switching button (Y in step 112), the classification support processing unit 13 causes another candidate set to be displayed on the screen (step 117). Since the candidate sets are arranged in an order of priority concerning a predetermined index (e.g., scan time and date), the classification support processing unit 13 causes a candidate set that is next to the currently-displayed set in the order of priority (i.e., a candidate set whose priority is one level below the currently-displayed set) to be displayed when the "NEXT" button 35 is selected. When the "RETURN" button 36 is selected, the classification support processing unit 13 causes a candidate set that is previous to the currently-displayed set in the order of priority (i.e., a candidate set whose priority is one level above the currently-displayed set) to be displayed.

FIG. 11 illustrates an example of a display screen displayed after the displayed candidate set is switched from a candidate set 1 to a candidate set 2 in response to an operation for selecting the candidate switching button. Similarly, in this case, the classification support processing unit 13 inserts the page to be processed 24 into a position of page 2, that is, a position between an image 37 of page 1 and image 38 of page 3 of the displayed set.

In a case where the user determines that the candidate sets do not include a set to which the page to be processed belongs, the user selects a "RETURN" button 40. In response to this operation (N in step 113), the processing returns to step 109, in which the classification support processing unit 13 causes the display screen illustrated in FIG. 5 to be displayed. When the user determines that the page selected in FIG. 4 is not proper, the user selects a "NO" button 29 on the display screen illustrated in FIG. 5. In this case (N in step 110), the processing returns to step 106, in which the classification support processing unit 13 causes the display screen (FIG. 4) on which the page type candidates are displayed to be displayed so that the user can select a page type again.

Meanwhile, in a case where the user determines that the displayed candidate set is a set to which the page to be processed belongs, the user selects an "OK" button 39. In response to this operation (Y in step 113), the classification support processing unit 13 adds, as page 2, the page to be processed to the displayed candidate set and registers the set including the page to be processed in the set classification unit 12 (step 114).

FIG. 12 illustrates an example of a display screen displayed in a case where the page to be processed has been registered. In a case where the page to be processed is registered in any document set, the classification support processing unit 13 displays, for the user, a message 41 including information for specifying this set.

As described above, in the present exemplary embodiment, the user is prompted to select a sample page which the user presumes to be a document type of the page to be processed from among the sample pages displayed in the display region 23 of the display screen illustrated in FIG. 4. In this way, the user can find a set to which the page to be processed belongs. In a case where the user cannot find a set to which the page to be processed belongs from the sample pages displayed in the display region 23, the user selects "NOT FOUND" button 27. When the "NOT FOUND" button 27 is selected, the classification support processing unit 13 determines that the user could not find a set to which the page to be processed belongs (N in step 108), and registers the page to be processed in the solitary page storage unit 18 as a solitary page (step 116). FIG. 13 illustrates an example of a display screen on which solitary pages stored in the solitary page storage unit 18 are displayed according to the present exemplary embodiment.

When the user confirms that the page to be processed has been registered as a solitary page, the user selects the "OK" button 42. Then, the processing proceeds to step 115.

In FIG. 3, the selected page is processed as above. In a case where the above processing has not been performed on all unclassified pages (N in step 115), the processing returns to step 104, in which the classification support processing unit 13 causes the display screen illustrated in FIG. 3 to be displayed.

The pages types include not only forms but also attached documents. Even in a case where the page to be processed is an attached document, the page to be processed is processed in a similar manner. Since the attached document is a page attached to any document set, it is highly likely that information associating the set and the attached document is written on any form included in the set.

Figure 14:
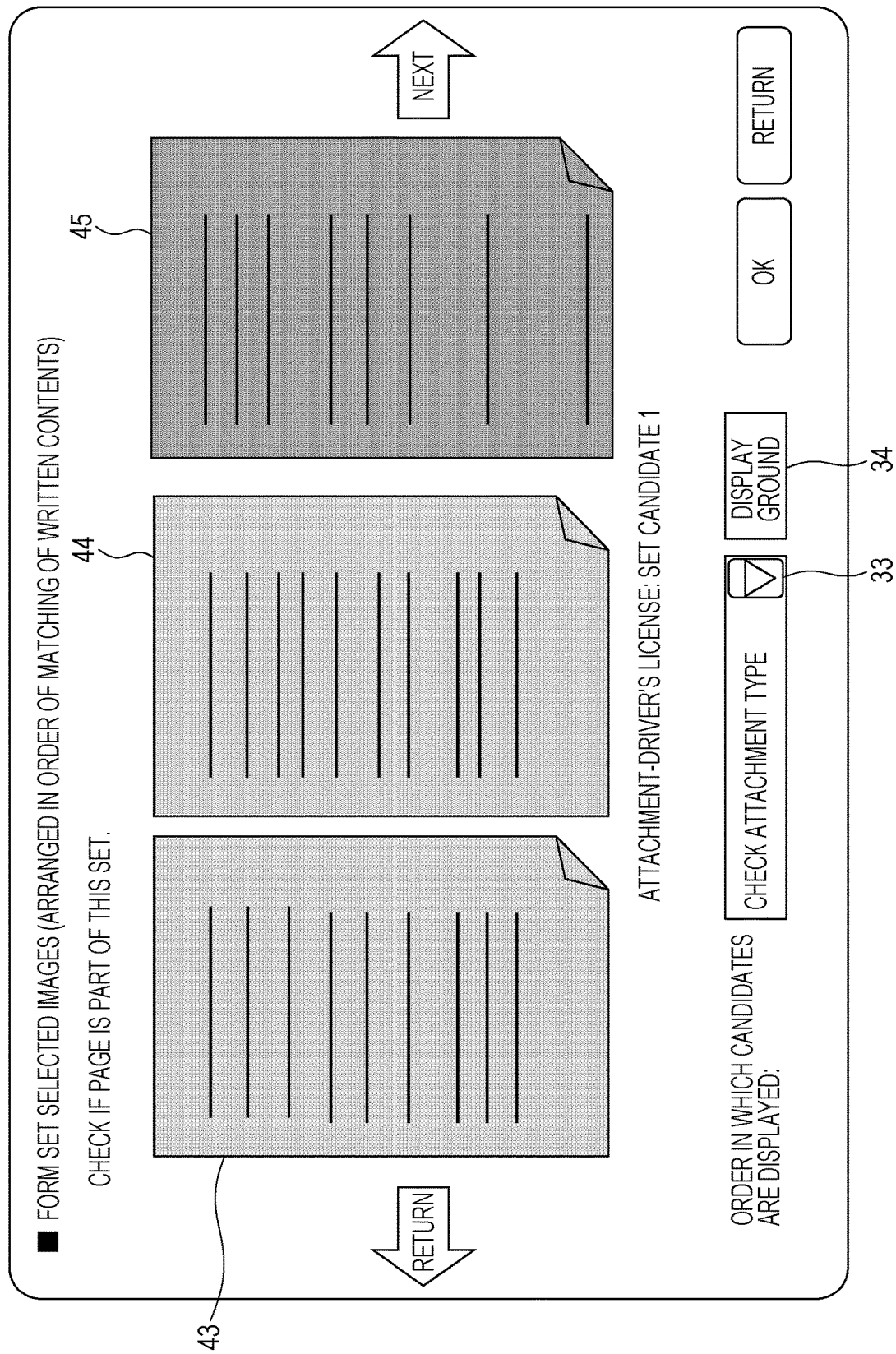
FIG. 14 illustrates an example of a display screen displayed when a user determines that a type of a sample document is correct in a case where the page to be processed is an attached document in FIG. 5 or 6.
Figure 15:
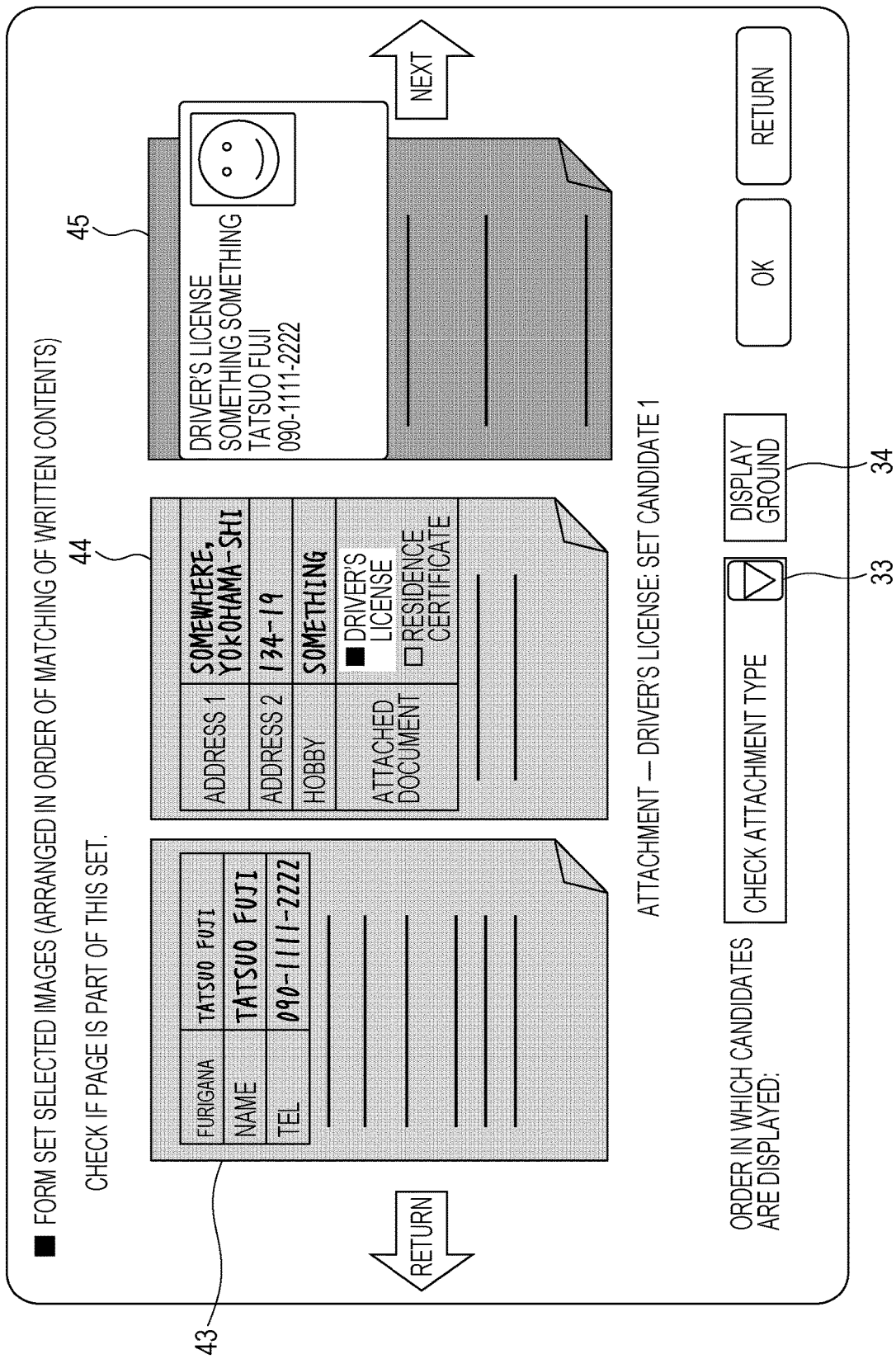
FIG. 15 illustrates an example of a display screen on which a reason for selection of a displayed candidate set as a candidate is displayed according to the present exemplary embodiment.

FIG. 14 illustrates an example of a display screen displayed in a case where the "YES" button 28 is selected on the display screen illustrated in FIG. 5 or 6 in a case where the page to be processed is an attached document. FIG. 14 corresponds to FIG. 7 in which the page to be processed is not an attached document but a form. In FIG. 14, the page type is an attached document, and a "candidate set 1" is displayed. Although a function for allowing the user to check whether or not a displayed candidate set is a correct set to which the page to be processed belongs has been described above with reference to FIGS. 8 through 10, a different index is used to give priorities to the candidate sets in the case of an attached document.

When the user causes the pull-down menu to be displayed by operating the arrow button 33 and selects "CHECK ATTACHMENT TYPE" in the pull-down menu, the classification support processing unit 13 extracts a character string that specifies a page type ("driver's license" in this example) of the page to be processed from images 43 and 44 of pages included in the set candidate by performing character recognition processing on the page to be processed 45 and the images 43 and 44 in response to this operation. The classification support processing unit 13 arranges the set candidates in a descending order of the number of times of extraction of the character string "driver's license" or an order of similarity to a candidate set, for example, based on positions of the character string "driver's license" in the images 43 and 44, that is, arranges the set candidates in a descending order of similarity to the type of the attached document.

When the user selects the "DISPLAY GROUND" button 34 after selecting an index (a type of the attached document in this example) for determining an order of priority of candidate sets, the classification support processing unit 13 causes a character string ("driver's license" in this example) indicative of the type of the attached document to be displayed in a noticeable manner (e.g., colored by a marker) in response to this selecting operation, as illustrated in FIG.

15. Except for this, the processing is the same as that in the case where the page type is a form, and therefore description thereof is omitted.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document processing apparatus comprising
a processor configured to:
    receive document data including a plurality of document pages which are going to be classified into a plurality of document sets, each document set including a predetermined plurality of document pages;
    calculate a classification certainty of each document page, the classification certainty being an index indicative of accuracy of automatic determination of a page type;
    classify the document data into a plurality of document sets by classifying each document page having the classification certainty that is greater than or equal to a threshold value into a corresponding set,
    wherein a document page having the classification certainty that is less than the threshold value is an unclassified page; and
    in a case where the document data includes the unclassified page, display a candidate document set to which the unclassified page is presumed to belong,
    wherein for the candidate document set, a number of document pages which have been classified into the candidate document set from the document data is less than a number of the plurality of document pages of the document set corresponding to the candidate document set.

2. The document processing apparatus according to claim 1, wherein
the processor is configured to display the candidate and the unclassified page on an identical screen.

3. The document processing apparatus according to claim 2, wherein
the processor is configured to display the unclassified page in a manner such that the unclassified page is inserted into a position of a missing page of the candidate.

4. The document processing apparatus according to claim 1, wherein
the processor is configured to display, as the candidate, a set that is similar in at least one of time and date of receipt, handwriting of a written character, and written contents to the unclassified page.

5. The document processing apparatus according to claim 1, wherein
the processor is configured to display a ground for selection of the candidate.

6. The document processing apparatus according to claim 5, wherein
the ground is a part in which the unclassified page and the candidate are similar to each other.

7. The document processing apparatus according to claim 1, wherein
in a case where there are plural candidates for the document set, the processor is configured to give the candidates priority levels based on degrees of similarity to the unclassified page and arrange the candidates in a descending order of the priority levels.

8. The document processing apparatus according to claim 1, wherein
in a case where no candidate has been extracted, the processor is configured to register the unclassified page in a predetermined storage.

9. A non-transitory computer readable medium storing a program causing a computer to execute a process for document processing, the process comprising:
    receiving document data including a plurality of document sets, each document set including a predetermined plurality of document pages;
    calculating a classification certainty of each document page, the classification certainty being an index indicative of accuracy of automatic determination of a page type;
    classifying the document data into the plurality of document sets by classifying each document page having the classification certainty that is greater than or equal to a threshold value into a corresponding set,
    wherein a document page having the classification certainty that is less than the threshold value is an unclassified page; and
    in a case where the document data includes the unclassified page, displaying a candidate document set to which the unclassified page is presumed to belong,
    wherein for the candidate document set, a number of document pages which have been classified into the candidate document set from the document data is less than a number of the plurality of document pages of the document set corresponding to the candidate document set.

10. A document processing apparatus comprising:
    means for receiving document data including a plurality of document pages which are going to be classified into a plurality of document sets, each document set including a predetermined plurality of document pages;
    means for calculating a classification certainty of each document page, the classification certainty being an index indicative of accuracy of automatic determination of a page type;
    means for classifying the document data into the plurality of document sets by classifying each document page having the classification certainty that is greater than or equal to a threshold value into a corresponding set, wherein a document page having the classification certainty that is less than the threshold value is an unclassified page; and means for, in a case where the document data includes the unclassified page, displaying a candidate document set to which the unclassified page is presumed to belong, wherein for the candidate document set, a number of document pages which have been classified into the candidate document set from the document data is less than a number of the plurality of document pages of the document set corresponding to the candidate document set.

\* \* \* \* \*